INVENTOR.
Marvin T. Wobrock
BY
Charles R. White
ATTORNEY

United States Patent Office 3,429,412
Patented Feb. 25, 1969

3,429,412
AUTOMATIC CLUTCH WEAR COMPENSATION
Marvin T. Wobrock, Fraser, Mich., assignor to General Motors Corporation, Detroit, Mich., a corporation of Delaware
Filed July 11, 1966, Ser. No. 564,277
U.S. Cl. 192—111　　　　　　　　　　　　5 Claims
Int. Cl. F16d *11/00, 13/60, 19/00*

ABSTRACT OF THE DISCLOSURE

A control linkage for a friction clutch incorporating an operator mechanism, which effects engagement of an intermediate, constant-lash clutching mechanism in the linkage. After predetermined movement of the operator mechanism, the intermediate clutching means engages and a force is transmitted by the linkage to the friction clutch to effect the disengagement thereof. When the operator mechanism is released, biasing means disengages the intermediate clutching mechanism to permit the driven part of the intermediate clutch to rotate relative to the drive part in response to wear of the friction clutch.

---

This invention relates to a friction unit control linkage in which there is provided constant and predetermined free travel of an operator member prior to control of the friction unit by the control linkage regardless of amount of wear of selectively engageable and disengageable unit friction plates.

In automotive vehicles it is generally the practice to provide a friction unit, such as a friction clutch, having drive and driven plates to connect and disconnect the vehicle engine from the power transmission. The friction clutch plates when disengaged allow the engine to develop sufficient torque to initially move the vehicle. When upshifting or downshifting, the engine is disconnected from the load to permit smooth shifts. A clutch control linkage which extends from a clutch release lever to the operator compartment provides a mechanism allowing the operator to control clutch apply. When initially moving the vehicle, for example, relative slippage of the clutch plates is desired to permit engine power to be gradually applied to the load, thereby enhancing smooth vehicle operation. After this gradual apply of the clutch the clutch plates are frictionally coupled with no slippage for transmission of full engine power to the transmission.

In these linkages there is generally provided free pedal travel which is the amount of movement made by the operator member or clutch pedal before the linkage is actuated to initiate disengagement of the clutch. The main purpose of this free pedal travel is to insure that the clutch is fully engaged when the clutch pedal is released. If free pedal travel were not provided in such linkages, the clutch pressure springs would act through the linkage and possibly the clutch pedal would prevent complete clutch engagement upon contact of its limit stop. This is particularly the case as the frictional faces of the clutch plates wear. In such cases there will be relative motion between the drive and driven clutch plates with the clutch pedal fully released, resulting in rapid clutch wear, inefficient torque transmittal and marginal vehicle operation.

To prevent the possibility of only partial engagement of the clutch plates when partially worn, free pedal travel adjustment devices are generally utilized in the linkages between the clutch pedal and the clutch. These devices are adjusted under these conditions to insure that the clutch is fully engaged when the pedal is released. Although providing for free pedal travel, the prior art did not usually provide for a constant amount of free travel.

The present invention concerns a control linkage in which there is incorporated a self-adjusting feature which provides for a constant amount of free pedal travel regardless of amount of clutch wear, thereby insuring full clutch engagement on release of operator pedal. Basically this invention may be made in a preferred form by separating the linkage system into two separate cooperating linkages. Clutch face wear will act on one of the separate linkages but not affect the other. However, on depression of the clutch pedal for clutch release the two linkages will be brought into interplay for joint action in release of the clutch.

It is an object of this invention to provide control linkage for a torque transmitting control unit which includes an operator member movable to control disengagement of the torque transmitting unit for controlled torque transmittal and further in which there is free operator member travel before unit disengagement is initiated.

Another object of this invention is to provide a control linkage for a torque transmitting unit which includes an operator lever operable to disengage the torque transmitting unit for no torque transmittal and in which there is a constant amount of free operator travel before unit disengagement is initiated.

Another object of this invention is to provide a control linkage for a torque transmitting clutch in which the linkage is actuated by a force through a clutch lever to thereby disengage a power plant from a drive line for no torque transmittal; the linkage, upon being released from apply force through the clutch lever, permits free relative rotation between certain segments of the linkage resulting in unrestricted contact between the frictional surface of drive and driven plates of the clutch unit.

Other features, objects and advantages of this invention will become more apparent from the detailed description of a practical and preferred embodiment of the invention in which.

Figure 1:
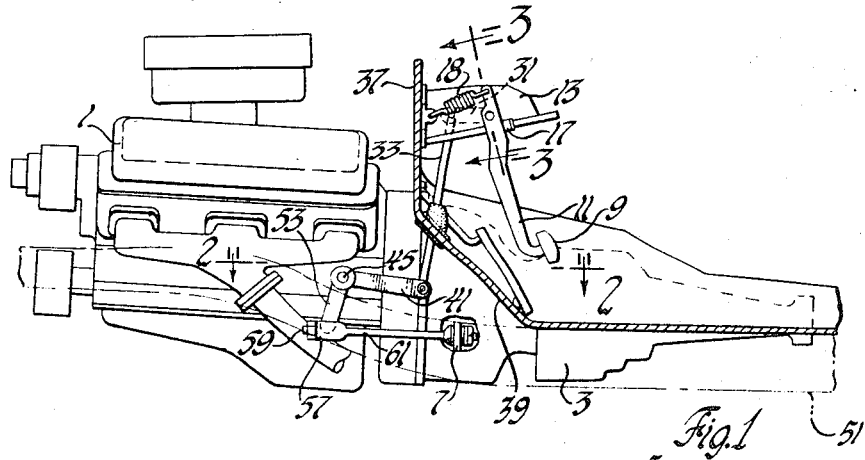
FIGURE 1 is a side elevational view of the invention.

Turning now to the drawings, there is shown in FIGURE 1 a vehicle engine 1 coupled to a transmission 3 through a clutch 5 having an outwardly extending release fork 7 for controlling the release of the clutch and thereby the flow of power from the engine to the transmission. Still further in FIGURE 1, there is a clutch pedal 9 suitably secured at one end to a clutch pedal lever 11 that is rotatably mounted on a brace 13 by an elongated shaft 15 which extends completely through spaced side flanges 16 of the brace. The lever 11 is normally held at a released position against a limit stop 17 by action of a return spring 18, secured at one end to one end of the clutch pedal lever and at the other end to front panel structure. The brace 13 carries a cam member 19 suitably secured thereto. This cam member has an indentation 20 formed therein which provides an inclined cam surface and also has a flat dwell 21. A second cam member 22 is suitably secured to the rotatable lever 11. This latter cam member has a projection 23 which provides a cam follower which normally mates with the indentation 20 when the clutch pedal is in the released position.

The far end of the shaft 15 carries a drive element 28 rigidly fixed thereto by a nut and bolt connection illustrated at 24. The drive element has internal dog teeth 25 which face the separate dog teeth 26 provided on driven element 27 which is suitably bored to rotatably accommodate the shaft 15. A separator spring 29 is located in the illustrated bore formed in the driven element to normally hold the drive and driven element separate with no engagement of the dog teeth.

The driven element carries an elongated pull rod lever 31 that extends outwardly therefrom; the end of this lever has an eye through which the turned end of a pull rod 33 is pivotally mounted. A suitable antifriction sleeve 35 may be provided between the pull rod lever and pull rod. With the pedal lever 11 in the released position the pull rod lever normally extends inwardly toward the panel 37 of the vehicle while the pull rod extends downwardly through the floor board 39 as best shown in FIGURE 1. The end of the pull rod is pivotally mounted to the end of a lever arm 41 and held thereto by spring retainer 43 as shown best in FIGURE 2. This last-mentioned lever arm is integral with a pivoted cross shaft 45 which is mounted by suitable pivots 48 betwen bracket structures 47 and 49 mounted respectively on the engine 1 and vehicle frame 51.

The cross shaft has a downwardly extending lever 53 formed at one end thereof which has an opening through which a threaded pin 55 of a swivel unit 57 extends. The swivel unit has an opening extending through the head thereof which receives the threaded end 59 of a push rod 61 illustrated in FIGURES 1 and 2. A nut 63 is used to fasten the push rod to the swivel unit. The push rod extends rearwardly and has a spherical bearing member 65 and a central threaded portion 67 which extends through an opening in an end portion of the clutch release fork 7. A nut 69 is used to secure the push rod to the clutch release fork as shown.

If it is desired to place the vehicle in a condition in which no engine power reaches the vehicle drive wheels, the clutch pedal 9 is depressed with the operator applying a force thereto sufficient to overcome return spring 18. When so depressed the cam follower 23 will ride up on the inclined surface of the cam or indentation 20 to laterally move the drive shaft 15 and the drive element to the left so that the dog teeth on the drive member 23 will engage the dog teeth on the driven member 27. The amount of movement which occurs before this drive engagement is known in the art as lash and is the amount of free pedal travel which occurs before operation of the clutch release linkage. Due to the fact that the cams are fixed to the pedal lever and the brace 13 lash is always the same in this invention and there is a substantially constant free pedal travel regardless of wear of the friction faces of the clutch.

After the dog teeth are engaged the cam follower will ride on the flat dwell 21 so that there will be only a turning movement of the drive and driven members and no further lateral movement of the shaft 15 and the drive member 23. As the driven member is turned the pull rod lever will be turned upwardly in FIGURE 1 to actuate the pull rod 33. This turns the lever arm 41 and the attached cross shaft will be turned on its pivot. The cross shaft lever arm 53 will be turned relative to the pivot axis of the cross shaft and the swivel unit will be actuated along with the attached push rod 61. The push rod 61, acting through the spherical bearing 65, will push on the clutch release fork 7 to release the clutch and disengage the engine from the drive line. At this time the engine may be started, ratios changed, or other vehicle operations may be performed.

Figure 2:
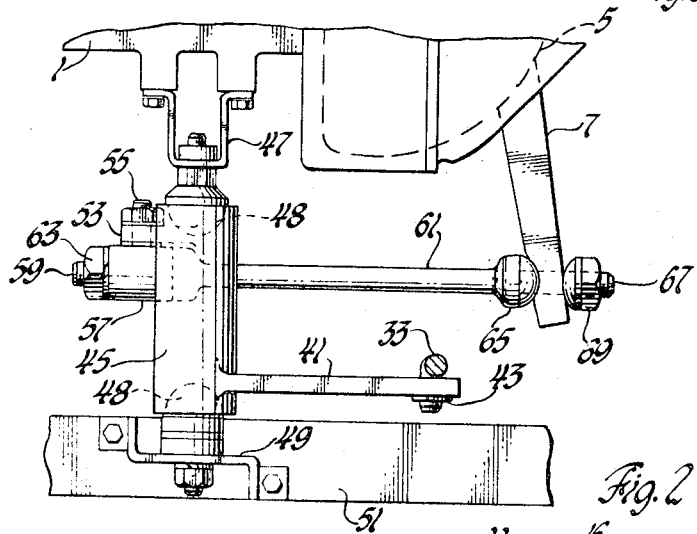
FIGURE 2 is a view taken along line 2—2 of FIGURE 1.
Figures 3, 4:
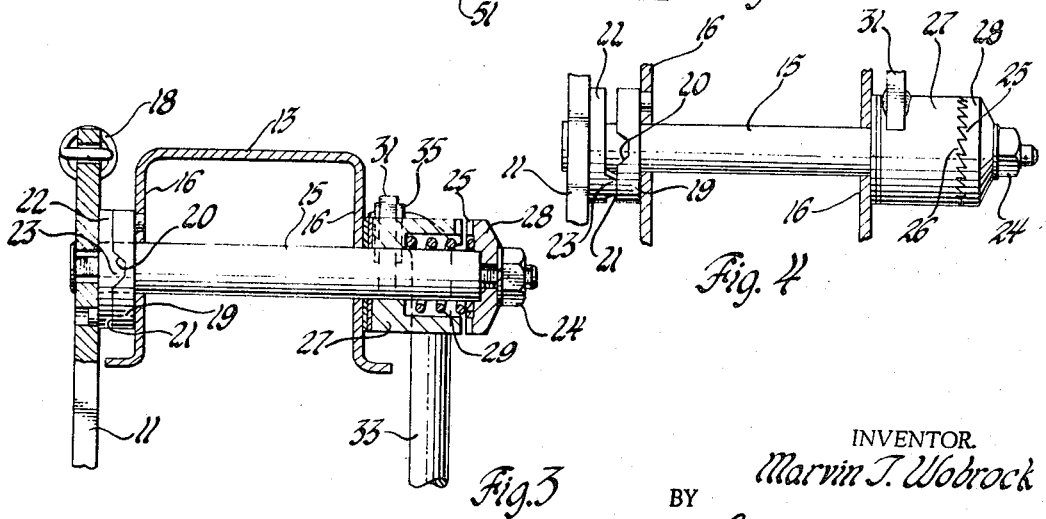
FIGURE 3 is a sectional view taken along line 3—3 of FIGURE 1.
FIGURE 4 is a view similar to that of FIGURE 3 showing certain elements thereof in full lines.

Upon release of the clutch pedal by the operator, the return spring will return the clutch pedal to its limited position shown in FIGURE 3 while the pressure springs in the clutch will apply the clutch and pivot the clutch release fork clockwise as seen when viewing FIGURE 2. This, of course, pushes the push rod to the left and turns the cross shaft on its pivot axis. As the cross shaft turns, the lever arm 41 will pull the pull rod downwardly and thereby turn the driven element 27 relative to the drive element 28; which elements are now separate by action of the return spring 18. Since the driven element is freely rotatable by action of the pull rod, there is no need for free pedal travel adjustments as in most prior art devices.

It will be appreciated that as the clutch faces wear, the driven element 27 will be turned by operation of the linkage as described immediately above without in any way affecting the drive element. Thus there is no possibility of the clutch pedal preventing full engagement of the clutch plates and vehicle operation is thereby improved. As the clutch plates wear the driven member will be rotated relative to the drive member. When wear is sufficient to turn the driven member one tooth or more relative to the drive member, it will be understood that different teeth will engage as compared to the previous engagement.

From the above drawings and description it will be apparent that this invention has eliminated the requirement for free pedal travel adjustment during wear of the clutch plates. Also, operation or release of the clutch is improved since lash is always the same regardless of the clutch plate wear. Since the free travel adjustment has been eliminated, parts have been eliminated and the linkage subsequently improved.

Although a particular and preferred embodiment of applicant's invention has been illustrated and described, it will be understood that applicant is not to be restricted to any particular forms of the invention so illustrated and described but only by the scope of the claims which follow.

I claim:

1. In combination with a clutch having a release lever movable in one direction for release of the clutch and movable in an opposite direction in response to engagement of the clutch, a clutch operating linkage including an operator lever, a drive shaft secured to said operator lever, a drive member spaced from said operator lever secured to said shaft, a driven member, means coupling said driven member to said release lever, means for moving said shaft longitudinally in response to movement of said operator lever, said drive and driven members engaging on movement of said shaft longitudinally in one direction thereby operatively coupling said operator lever to said release lever, said release lever being moved in the first-mentioned direction in response to movement of said operator member in one direction to release the clutch, means for moving said operator member in an opposite direction, and means for separating said drive and driven members on movement of said operator member in the last recited direction, said release lever moving said driven member relative to said drive member pursuant to engagement of said clutch.

2. The combination defined in claim 1 in which said means for moving said shaft longitudinally includes cam means secured to said operator lever.

3. The combination of claim 1 in which said driven member is rotatable relative to said drive member in response to movement of said release fork pursuant to engagement of said clutch.

4. In a clutch control linkage, a torque transmitting clutch unit, said clutch unit having a pivotally mounted clutch release fork normally biased in one direction, a rotatable operator member, a drive member operatively coupled to said operator member, a driven member operatively coupled to said release fork, said drive and driven members having mutually engageable clutching surfaces, first and second cams actuated by apply of predetermined force to said operator member in one direction for camming said clutching surfaces into mutual engagement, said clutching surfaces when engaged permitting said operator member to move said release fork in a direction opposite to the biased direction to disengage said clutch unit from torque transmittal, means for disconnecting said drive and driven members including automatic means for turning said operator member to a position in which said first and second engageable cams allow separation of said clutching surfaces, one of said cams being fixed to said operator member for movement therewith, support means for securely mounting the other of said cams, a drive shaft extending from said operator member and rotatably mounted in said support means, said drive member being supported by said drive shaft for movement therewith, said driven member being mounted on said drive shaft, and said means for disconnecting said drive and driven members further including a spring member mounted between said drive and driven members and mounted on said drive shaft.

5. In a clutch control linkage, a selectively engageable and disengageable clutch unit, a rotatable lever member rotatable in response to a force applied thereto for effecting the disengagement of said clutch unit, a rotatable shaft operatively connected to said lever member for rotation therewith, a clutching mechanism operatively disposed between said lever member and said clutch unit comprising coaxial first and second clutch parts, connector means rigidly fastening said first clutch part to said rotatable shaft, linkage means operatively connecting said second clutch part to said clutch unit, spring means disposed between said first and second clutch parts for biasing said first and second clutch parts into a spaced coaxial relationship in which said first and second clutch parts are disengaged to permit said second clutch part to rotate relative to said first clutch part in response to wear of said clutch unit, and cam means rigidly secured to said lever member for moving said rotatable shaft in a longitudinal direction to force said first and second clutch parts into torque transmitting engagement after predetermined movement of said lever member so that the force applied to said lever member is transmitted to said clutch unit.

References Cited

UNITED STATES PATENTS

| | | |
|---|---|---|
| 3,307,667 | 3/1967 | Maurice. |
| 3,304,511 | 4/1967 | Randol. |
| 3,365,042 | 1/1968 | Smirl et al. |
| 541,712 | 6/1895 | Blume _____ 192—100 |
| 1,830,306 | 11/1931 | Wemp. |
| 2,380,308 | 7/1945 | Harstick _____ 192—100 X |

BENJAMIN W. WYCHE III, *Primary Examiner.*

U.S. Cl. X.R.

74—512; 188—196; 191—93, 100

UNITED STATES PATENT OFFICE
CERTIFICATE OF CORRECTION

Patent No. 3,429,412 February 25, 1969

Marvin T. Wobrock

It is certified that error appears in the above identified patent and that said Letters Patent are hereby corrected as shown below:

Column 3, line 17, "betwen" should read -- between --. Column 6, line 13, "3,304,511" should read -- 3,314,511 --.

Signed and sealed this 7th day of April 1970.

(SEAL)
Attest:

Edward M. Fletcher, Jr.
Attesting Officer

WILLIAM E. SCHUYLER, J1
Commissioner of Patent